(12) United States Patent
Bregman et al.

(10) Patent No.: US 11,605,472 B2
(45) Date of Patent: Mar. 14, 2023

(54) CLOSED-VESSEL MOLTEN SALT FISSION REACTOR

(71) Applicant: BK Clean Energy LLC, Denver, CO (US)

(72) Inventors: Harry L. Bregman, Denver, CO (US); Gregory F. Kushnir, Denver, CO (US)

(73) Assignee: BK CLEAN ENERGY LLC, Denver, CO (US)

( * ) Notice: Subject to any disclaimer, the term of this patent is extended or adjusted under 35 U.S.C. 154(b) by 0 days.

(21) Appl. No.: 17/833,530

(22) Filed: Jun. 6, 2022

(65) Prior Publication Data
US 2023/0005628 A1 Jan. 5, 2023

Related U.S. Application Data

(60) Provisional application No. 63/216,960, filed on Jun. 30, 2021.

(51) Int. Cl.
*G21C 7/30* (2006.01)
*G21C 1/22* (2006.01)
(Continued)

(52) U.S. Cl.
CPC .......... *G21C 7/30* (2013.01); *G21C 1/22* (2013.01); *G21C 5/02* (2013.01); *G21C 7/26* (2013.01);
(Continued)

(58) Field of Classification Search
CPC ... G21C 7/30; G21C 7/26; G21C 5/02; G21C 3/54; G21C 1/22; G21C 15/04; G21F 5/065
(Continued)

(56) References Cited

U.S. PATENT DOCUMENTS 3,205,138 A * 9/1965 Barr .................. G21C 5/14
376/904
3,320,969 A * 5/1967 Gordon ............. G21C 13/10
376/293
(Continued)

OTHER PUBLICATIONS

Greenspan, "The Encapsulated Nuclear Heat Source Reactor Concept", ICONE-8750, Baltimore, MD (US), Apr. 2000. (Year: 2000).*
(Continued)

*Primary Examiner* — Jack W Keith
*Assistant Examiner* — Daniel Wasil
(74) *Attorney, Agent, or Firm* — Brownstein Hyatt Farber Schreck, LLP

(57) ABSTRACT

A closed-vessel molten salt reactor (cvMSR) is described herein. A cvMSR may comprise a suspended container, such as a metallic container, within a trench surrounded by a concrete enclosure and a concrete cover having a number of channels. The suspended container may be hollow and a solution of fissile materials and salt materials may be provided within the suspended container. The solution may be capable of undergoing a chain reaction nuclear fission process once a threshold temperature is reached. Heat generated by the solution may heat a fluid surrounding the suspended container. The heated fluid may be transported, through the number of channels of the concrete cover, to an external location where the heated fluid may be used in distributing heat and/or electricity generation.

15 Claims, 15 Drawing Sheets

(51) Int. Cl.
  *G21C 5/02*    (2006.01)
  *G21C 7/26*    (2006.01)
  *G21C 3/54*    (2006.01)
  *G21C 15/04*   (2006.01)
  *G21F 5/06*    (2006.01)
(52) U.S. Cl.
  CPC ............... *G21C 3/54* (2013.01); *G21C 15/04* (2013.01); *G21F 5/065* (2013.01)
(58) Field of Classification Search
  USPC ............... 376/287, 288, 290, 293, 294, 904
  See application file for complete search history.

(56) References Cited

U.S. PATENT DOCUMENTS

| 4,202,552 | A  | * | 5/1980 | Hirs ..................... | G21C 15/247 376/289 |
|---|---|---|---|---|---|
| 2017/0084354 | A1 |   | 3/2017 | Hansen | |
| 2018/0019025 | A1 | * | 1/2018 | Abbott ..................... | G21C 3/54 |
| 2020/0027593 | A1 | * | 1/2020 | Beckett ................. | G21C 13/08 |

OTHER PUBLICATIONS

Tanaka, "Damage and Fracture Analysis of Brittle Structural Elements Reinforced with Carbon Fiber Sheets", Journal of Environment and Engineering 3, No. 1 (2008): 111-122. (Year: 2008).*

Karbhari, "Use of composite materials in civil infrastructure in Japan", WTEC report. International Technology Research Institute, World Technology (WTEC) Division (1998). (Year: 1998).*

\* cited by examiner

CLOSED-VESSEL MOLTEN SALT FISSION REACTOR

CROSS-REFERENCE TO RELATED APPLICATION(S)

This application is a nonprovisional patent application of and claims the benefit of U.S. Provisional Patent Application No. 63/216,960, filed Jun. 30, 2021 and titled "Closed-Vessel Molten Salt Fission Reactor," the disclosure of which is hereby incorporated herein by reference in its entirety.

TECHNICAL FIELD

The provided description generally relates to a nuclear fission reactor and to associated containment structures. More particularly, the present embodiments relate to molten salt reactors that utilize passive cooling systems to prevent or decrease the probability of a potential complete or partial core collapse.

BACKGROUND

Modern nuclear reactors utilize physical principles of fission nuclear chain reactions and/or nuclear fusion reactions to generate heat. The generated heat may be used for a variety of purposes, such as electricity generation and/or heat transfer. In particular, the heat is generated at a reactor core, which contains a fissile material. Once a criticality is reached, the fissile material undergoes nuclear fission and emits heat and nuclear particles, such as free neutrons. Some of these emitted nuclear particles may further be absorbed by other fissile atoms, thereby causing a nuclear chain reaction. To avoid a runaway nuclear chain reaction, which may cause a reactor core collapse, coolant may be circulated to cool the reactor core, thereby moderating the nuclear chain reaction.

If the mechanisms that circulate the coolant become damaged, the cooling provided by the circulating coolant becomes ineffective. In such cases, this may result in runaway heating of the reactor core, reactor core collapse, and consequent breach of the containment structures. The general population may additionally be at risk due to the proliferation and spread of potentially dangerous radioactive materials escaping containment.

Reactor designs, such as Generation III/IV reactor designs, are intended to reduce the probabilities of core meltdown and breach. However, these reactor designs rely on active cooling systems, where a mechanical pump or a similar device acts to remove heat from a nuclear system. If the mechanical pump fails, therefore, a catastrophic reactor core collapse may result.

SUMMARY

In some embodiments, a closed-vessel molten salt reactor (cvMSR) is provided. The cvMSR may comprise an enclosure defining an internal cavity, a moveable container suspended within the internal cavity defined by the enclosure, the moveable container formed from a metallic material and including a set of corrugated walls, a salt mixture disposed within the moveable container and including a fissile material and a salt material, a resistive heater configured to apply heat to the salt mixture to bring the salt mixture to a temperature necessary for a criticality of the salt mixture such that the salt mixture undergoes a nuclear fission chain reaction, and a cover disposed on the enclosure, the cover including a number of hollow chambers extending across a length of the cover. In some cases, heat generated from the nuclear fission chain reaction may heat a fluid surrounding the moveable container, thereby creating a heated fluid, and the heated fluid may move toward the number of hollow chambers of the cover to be transported along the number of hollow chambers.

BRIEF DESCRIPTION OF THE DRAWINGS

Reference will now be made to representative embodiments illustrated in the accompanying figures. It should be understood that the following descriptions are not intended to limit the embodiments to one or more preferred embodiments. To the contrary, they are intended to cover alternatives, modifications, and equivalents as may be included within the spirit and scope of the described embodiments as defined by the appended claims.

Similar reference numerals have been used, where practicable, to designate similar features.

Figure 1A:
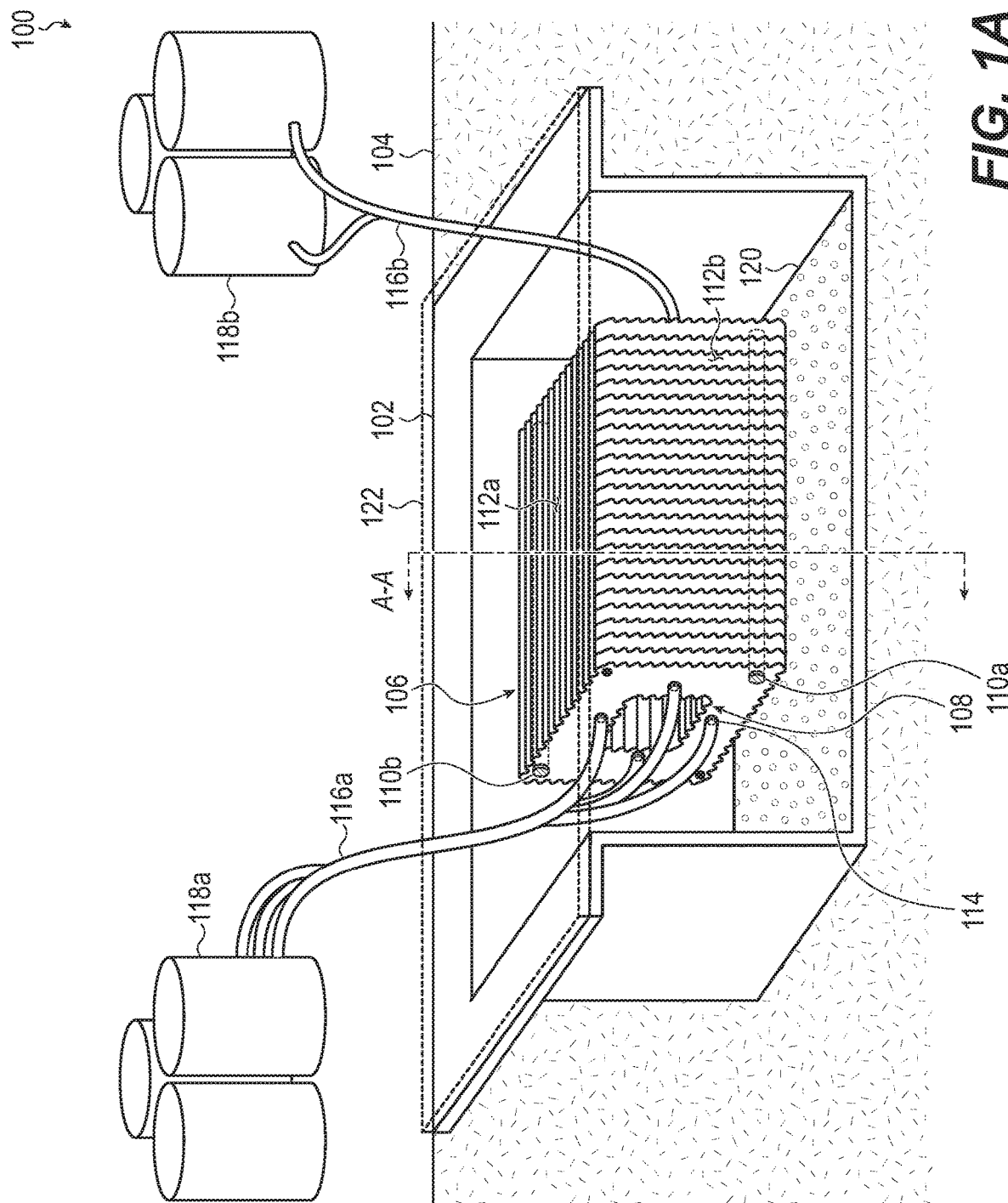
FIGS. 1A-1B illustrate an example closed-vessel molten salt reactor (cvMSR) including a suspended container containing a salt mixture, as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to small form-factor closed-vessel nuclear reactors that can be used, in a failsafe manner, to provide heat as a resource. A closed-vessel nuclear reactor as described herein can be defined by an interior volume into which fissile material can be disposed. A first internal surface (e.g., an internal sidewall that may be referred to herein as a "moderator surface") of the closed-vessel nuclear reactor can be formed from and/or with graphite or other moderator material and a second internal surface opposite the first surface (e.g., another internal sidewall that may be referred to herein as a "control surface") can be formed from and/or with boron carbide (or other borates) as a control material that absorbs neutrons.

As a result of this construction, adjusting a position and/or orientation of the closed-vessel nuclear reactor is all that is required to control reaction speed or, alternatively, to terminate the reaction. In particular, when the closed-vessel nuclear reactor is oriented such that the fissile material contacts a moderator surface, fission reaction within the closed-vessel nuclear reactor can be moderated to an implementation specific degree. In addition, when the closed-vessel nuclear reactor is oriented such that the fissile material contacts the control surface, the reaction may be stopped. In this manner, by controlling an orientation of the closed-vessel nuclear reactor, the reaction therein can be effectively moderated and/or terminated entirely. In some embodiments, an "upright" orientation refers to an orientation of a closed-vessel nuclear reactor in which a fission reaction therein is moderated and/or otherwise controlled and an "inverted" orientation refers to an orientation of the same reactor in which the fission reaction is controlled to a point of potentially stopping the reaction entirely.

The output heat can be used to heat one or more fluids or gases (e.g., air, helium, CO2 as examples), which in turn can, in some constructions, be leveraged to drive a turbine to generate electricity. In other cases, the output heat can be used as a direct resource, for example to heat a home or building or for a manufacturing purpose.

In some cases, output heat can be used to change a position of the reactor itself, thereby moderating the reaction. For example, in some embodiments, a closed-vessel nuclear reactor can be supported by a movable structure that selectively expands when heated to a certain degree. The structure can be formed/architected such that expansion due to heat tilts or otherwise reorients the closed-vessel nuclear reactor in order to slow the reaction contained therein, thereby reducing output heat. As output heat is reduced, the structure may contract, which in turn may reorient the closed-vessel nuclear reactors and augment reaction speed again.

In some cases, a closed-vessel nuclear reactor as described herein can be additively manufactured either on-site or in a manufacturing facility. In a more simple phrasing, an enclosure of a closed-vessel nuclear reactor as described herein can be 3D printed. More specifically, control materials/surface and/or moderator materials/surface can be printed and thereafter submitted to curing or finishing conditions.

In some constructions, a closed-vessel nuclear reactor can be wrapped in carbon fiber tow and high temperature epoxy for strengthening purposes. In some constructions, the epoxy material can be doped with an absorbent material such as boron or tungsten to shield radiation.

The foregoing examples are not exhaustive; more generally and broadly, described herein is a nuclear reactor and, more specifically, a closed-vessel molten salt reactor (cvMSR) as a type of nuclear fission reactor. In many embodiments, a cvMSR as described herein has a structure that facilitates passive cooling of a molten salt mixture and includes fail-safe structures, such as glass-forming frit additives positioned below a suspended container of the cvMSR, and ceramic structures designed to moderate, suspend, and/or prevent a nuclear and/or chemical reaction. The cvMSR may additionally be rotatable to agitate, cool, and/or heat the salt/fissile material mixture.

Conventional nuclear reactors, such as Generation III/W ("Gen III/W") reactors, are used to initiate and control a fission nuclear chain reaction. In order to provide cooling for such reactors, one or more pumps may be used to circulate water, or another coolant, past a reactor core to absorb heat generated by the reactor core.

Further, in the event of a core collapse, one or more pumps may cause generation of a jet of water, or other coolant, to the reactor core to quickly cool a reactor core in the hopes of avoiding core collapse. In the event of a power outage, backup generators may engage to activate the one or more pumps. However, active systems may still fail at a number of levels such as, but not limited to, complete power outage of both primary and backup systems, broken equipment (e.g., pumps), corrosion, cross-contamination, and so on.

Additionally, conventional cooling systems comprise a large, and complex, arrangement of pipes for transporting coolant. Having a large number of pipes within a cooling system introduces additional points of failure as pipes may corrode, may be blocked, and so on. Furthermore, such arrangements may be extremely costly in design efforts, construction, and maintenance.

In the event of a core collapse, or near-core collapse, conventional cooling mechanisms may further act to destroy the reactor core. For example, if a large amount of water were applied to a malfunctioning reactor core, the water and/or heat may destroy internal components of the reactor core, necessitating a complete replacement. Such replacement may be extremely costly, even if a core collapse is avoided.

Embodiments described herein generally reference a closed-vessel molten salt reactor (cvMSR). The cvMSR contains a solution of fissile materials and/or salt materials, in which a nuclear fission reaction may occur at low pressures (e.g., atmospheric pressure). The solution of fissile material and/or salt materials is heated at, or around, 500° C. to melt the salts and initiate the chain reaction through a nuclear fission reaction. Once initiated, the chain reaction continues and causes heating of a surrounding fluid (e.g., a fluid external to a container containing the solution of fissile materials and/or salt materials). The term "fluid," as used herein, may refer to any liquid or gas, including supercritical states. According to some disclosed embodiments, a surrounding fluid may be air, though other fluids, such as other gas mixtures, water, other liquids, and so on, may be used as a surrounding fluid. The heated surrounding fluid may then be used for any number of purposes, such as heating a building and/or area, producing steam for producing electricity, and so on and may be transported to a customer.

The cvMSR may additionally be both suspended, rotatable, and moveable, within an enclosed chamber, with the solution of fissile materials and/or salt materials provided within the cvMSR. As the cvMSR rotates, the solution of fissile materials and/or salt materials may be agitated to propagate the chain reaction and to heat the walls of the cvMSR, thereby providing heat. Such heat may then be removed from the exterior surface of the closed reactor vessel by circulating a heat transfer material around the exterior of the closed reactor vessel. The heat may then be used for any number of purposes, such as heating a building/area and/or producing steam for energy generation.

The solution of fissile materials and/or salt materials may be formed from any number of materials, such as thorium, uranium, plutonium, lithium-beryllium fluoride, lithium fluoride, uranium tetrafluoride, and so on. In some cases, the salt materials consist of lithium and beryllium fluoride salts and the fissile materials comprise low-enriched uranium fluorides. The salt materials may be solid under a threshold temperature (e.g., 500° C.) and may liquify within a range of about 500° C.-1400° C., at pressures around atmospheric pressure. Though the salt materials may be liquid through the range of about 500° C.-1400° C., an operating range of the cvMSR may be from about 550° C.-1000° C., or may be any range within a temperature range at which the salt materials are liquid (e.g., to avoid high temperatures). As the salt materials melt, the fissile materials may engage in a nuclear fission chain reaction.

In embodiments described herein, fission materials and/or salt materials may be added to the cvMSR through the use of input/exhaust ports and waste materials/gas (e.g., xenon gas) may be removed from the cvMSR through the input/exhaust ports. The input/exhaust ports may be located at both ends of the cvMSR. In some embodiments, input/exhaust ports on a first end are used to introduce material/gases to the cvMSR and input/exhausts ports on a second end, opposite from the first end, are used to remove material/gases from the cvMSR.

The cvMSR may be recycled from pre-fabricated containers (e.g., an ISO shipping container) or may be manufactured specifically for use as a cvMSR. The cvMSR may be hollow, so as to contain the solution of fissile materials and/or salt materials, and may be shaped as a rectangular-cuboid, though the cvMSR may have any shape. In addition, the cvMSR may have a tunnel that extends through a length of the cvMSR. As discussed below, the cvMSR may additionally include corrugations on both internal and external portions.

The corrugations may act to agitate a surrounding fluid outside of the cvMSR, as described above, and a solution of fissile materials and/or salt materials within the cvMSR. In addition, the corrugations may act as a heat sink and may transfer heat with respect to an internal volume of the cvMSR and an external volume surrounding the cvMSR.

Ceramic tiles and/or ceramic elements may additionally be provided on an interior surface of the cvMSR. In some cases, thermo-ceramic coatings are provided on an interior surface of the cvMSR. Additionally or alternatively, different forms of ceramic tile may be affixed to different interior surfaces. For example, a first ceramic may be affixed to one internal wall and may act as a fission catalyst. Additionally or alternatively, a second ceramic may be affixed to a different internal wall to moderate or halt a fission process. Ceramics may include any type of ceramics such as boron ceramics, graphite ceramics, and so on.

In the potential event that the solution of fissile materials and/or salt materials overheats, the cvMSR may be rotated and/or rocked (either manually or automatically) such that the solution of fissile materials and/or salt materials comes into contact with a ceramic that inhibits a fission reaction. In this way, a chain reaction may be stopped or slowed to achieve a particular temperature.

To restart the reaction, the cvMSR may be rotated to an original position (e.g., in contact with a ceramic that acts as a catalyst for a nuclear reaction) and associated resistive heaters may add heat to the system. As the term is used herein, rocking may refer to rotation of the cvMSR back-and-forth at or below 180° from a starting position, where the starting position is defined as a position of the cvMSR where criticality is at a maximum level.

An additional failsafe may be provided in the event that the solution of fissile materials and/or salt materials melts, or otherwise breaches, the cvMSR. Glass-forming frit additives may be provided beneath the cvMSR and may, with the addition of a molten solution of fissile materials and/or salt materials, melt into a borosilicate or phosphate glass, thereby neutralizing radioactive materials and preventing further fission.

Additional details of a cvMSR are provided herein. Through the use of such a cvMSR, a safety of a molten salt fission reaction may be improved even with a low-cost system. The cvMSR additionally provides the benefits of, for example, being resistant to geological activity (e.g., earthquakes) and of being rotatable (e.g., configured to rock at or below 180° from a starting position) to control a fission reaction and/or a temperature output (e.g., a temperature of air or other fluid surrounding a suspended container of an cvMSR). As discussed herein, the cvMSR may be any type of reactor, including a breeder reactor and/or a burner reactor.

These and other embodiments are discussed below with reference to FIGS. 1A-10. However, those skilled in the art will readily appreciate that the detailed description given herein with respect to these figures is for explanatory purposes only and should not be construed as limiting.

Figure 1B:
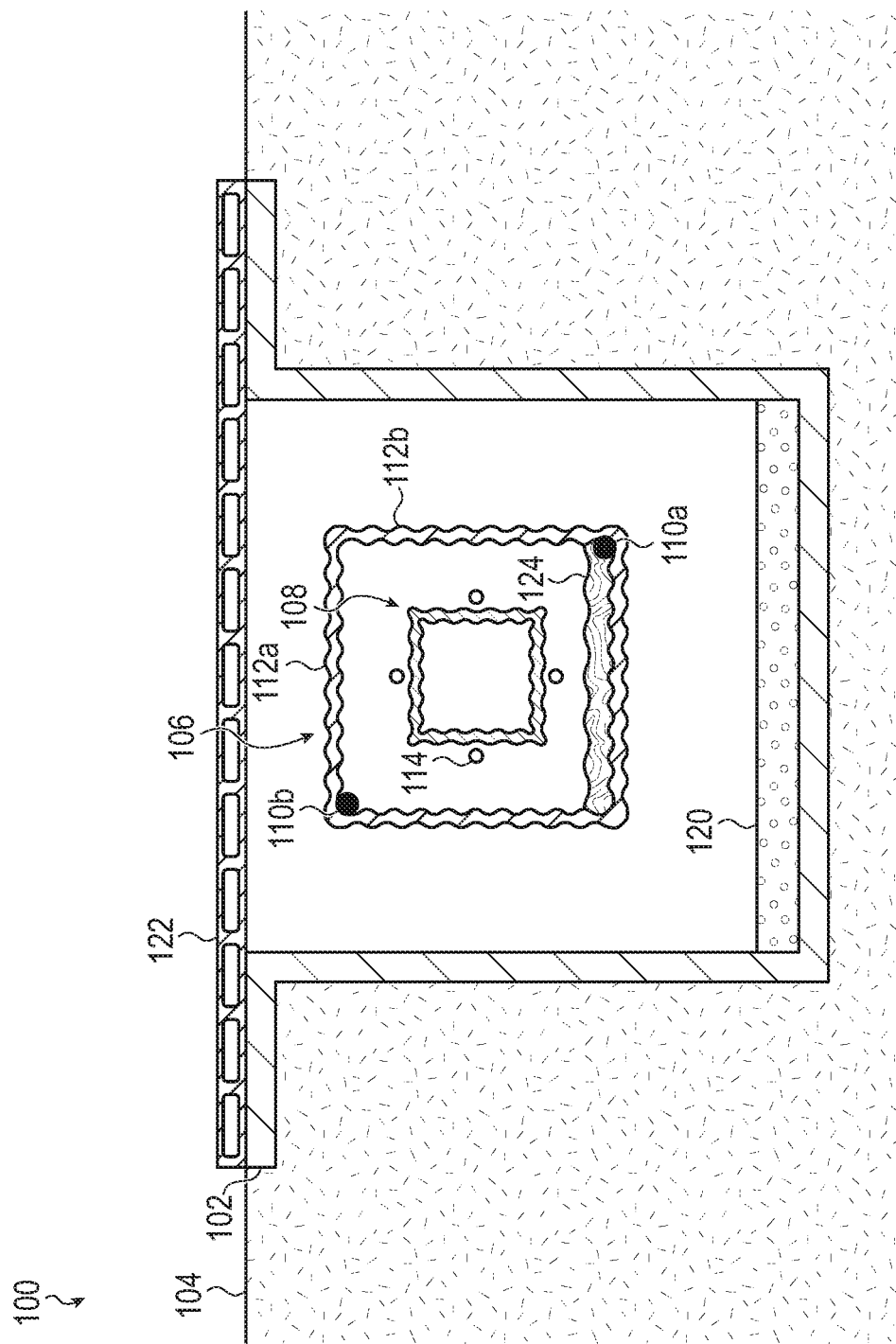

FIGS. 1A-1B illustrate an example closed-vessel molten salt reactor 100 having a suspended container 106 suspended within an enclosure 102 defining a trench. The enclosure 102 may be formed of a material, such as concrete, and may separate an internal cavity of the enclosure 102 from surrounding soil 104. The enclosure 102 may additionally comprise additives, such as concrete additives, that prevent leakage of radioactive material from the containment room and/or the suspended container 106.

The trench depicted in FIGS. 1A-1B, therefore, may be created by digging into the ground, by removing soil 104, and by pouring or otherwise placing a material such as concrete into the hole. In this way, the enclosure 102 may be provided within the ground and may be surrounded by soil 104. While the enclosure 102 is described as being surrounded by soil 104, it is appreciated that any enclosure 102 may be used and may be provided anywhere above, on, or below a surface of the Earth. In some cases, the enclosure 102 is formed as a concrete rectangular-cuboid and has a height between 8 and 50 feet, though any height, material, or shape may be used, based on space constraints, client needs, and/or desired heating capabilities.

In certain cases, the enclosure 102 may be positioned within or on top of a manmade structure and/or building, presuming the manmade structure and/or building is of sufficient structural strength and possesses sufficient safety considerations. The enclosure 102 may additionally be portable, so as to be moveable to and from installation locations.

A cover 122 (depicted in FIG. 1A as a dashed object on top of enclosure 102) may additionally be provided to fully enclose the cavity defined by the enclosure 102. The cover 122 may comprise hollow core slabs, or planks, formed from concrete, such as prestressed concrete. As depicted in FIG. 1B, the cover 122 may have a number of hollow chambers/voids that run across a length of the cover 122. During an operation of the cvMSR 100, hot air, or other suitable fluids (e.g., liquids or gases), surrounding the cvMSR 100 may be produced (e.g., hot air within the enclosure 102).

As the hot air rises, it may be captured within the hollow chambers of the cover 122. The hollow chambers may transport the hot air across a length/width of the cover 122 and may provide the hot air at an edge of the cover 122. The hot air may then be provided to ducting and/or transport structures to heat an area and/or to produce steam when applied to a reservoir of water. Described generally, the hot air may travel along the cover 122 and may be provided to a customer to, for example, provide heat to particular systems, such as a Brayton turbine. The cover 122 may have a thickness of around 18 inches (in.), though any thickness may be provided. While the term "hot air" is used above, it is noted that the fluid surrounding the cvMSR 100 is not limited to air and may include any gas (e.g., carbon dioxide) or liquid (e.g., water).

As depicted in FIG. 1A, a suspended container 106 may be suspended within the trench defined by the enclosure 102. Any manner of suspension may be used to suspend the suspended container 106. In some embodiments, a chain, such as a stud link or open link chain, affixes the suspended container 106 to walls of the enclosure. In such cases, the chain may be affixed to a front, side, top, bottom, and so on, wall of the suspended container 106. Instead of, or in addition to, chains, other suspension materials, such as ropes, wire, woven materials such as carbon fiber materials, and so on, may be used to suspend the suspended container 106. Alternatively or additionally, end portions of the suspended container may be coupled to a rotating mechanism (see FIG. 2A).

A glass 120 and/or glass-forming frit additives may be provided at a bottom portion of the enclosure 102. The glass 120 may be any glass capable of neutralizing radioactive wastes (e.g., high-level radioactive wastes HLW) such as borosilicate glass and/or phosphate glass. In the event that a molten salt breaches outer layers of the suspended container 106, gravity may direct the molten salt toward the glass 120. Through the process of vitrification, the molten salt may melt the glass 120, which may then be reformed once cooled. As the glass 120 may neutralize a fission chain reaction, the glass 120 may be used as a failsafe to contain/neutralize any radioactive material, thereby preventing additional chain reactions from occurring, in the event that the suspended container 106 is breached.

The suspended container 106 may include various corrugated surfaces, as depicted in FIGS. 1A-1B. Various kinds of corrugation may be provided, including corrugations with different patterns. For example, a first corrugation 112a may comprise horizontal corrugations where the corrugations extend across a length of the suspended container 106. The second corrugation 112b may comprise vertical corrugations where the corrugations extend across a width of the suspended container 106. Similarly, corrugations within an internal tunnel 108 may be formed from horizontal corrugations, vertical corrugations, any combination thereof, and so on.

The corrugations 112a,112b may act as turbulence-producing elements and may agitate a fluid surrounding the suspended container 106. In some cases, the fluid surrounding the suspended container 106 is air, though other fluids, such as water, may be used in addition or as an alternative fluid. By agitating the surrounding fluid, a heat transfer between the suspended container 106 and the surrounding fluid may be increased. Additionally, the corrugations 112a, 112b may act as a heat sink and may provide increased surface area for a heat transfer between the suspended container 106 and the surrounding fluid. In some cases, the corrugations are specifically tailored for the purposes of acting as a heat sink or agitating a fluid. For example, some corrugations may include elongated fins while others may include a number of peaks and valleys.

The corrugations 112a,112b may additionally mechanically strengthen the suspended container 106, such that the side-walls of the suspended container 106 are resistant to potential deforming forces.

The suspended container 106 may have a main body formed from a metallic material, such as a stainless steel. In some cases, the suspended container 106 is a recycled shipping container and has a length of 20 ft or 40 ft. In this way, the suspended container 106 may be retrofit. Ceramic tiles may be affixed to internal surfaces of the suspended container 106, such as internal surfaces depicted in FIG. 1B. The ceramic tiles may be made with certain specifications and may be formed with materials such as boron or graphite. The ceramic tiles may inhibit, catalyze, moderate, and/or otherwise influence operations of a solution of fissile materials and/or salt materials. Thermo-ceramic coatings may be used in additional or alternative cases.

Heating elements 110a,110b, such as resistive heaters, may additionally be provided along a length of the suspended container 106. The heating elements 110a,110b may be used to introduce heat to the solution of fissile materials and/or salt materials, so as to melt the salt materials into molten salt, and to provide conditions where a fission chain reaction may occur. As noted above, a certain temperature, such as 500° C., may be necessary to melt the salt materials and, accordingly, the heating elements 110a,110b may heat the solution of fissile materials and/or salt materials to that temperature. Though the heating elements 110a,110b are described as resistive heaters, any type of heating element may be used including ceramic heaters, conductive heaters, and so on.

As depicted in FIG. 1A, a first heating element 110a may be positioned on a corner opposite from the second heating element 110b. As the suspended container 106 is rotatable, the suspended container 106 may be rotated such that either the first heating element 110a or the second heating element 110b is positioned below the solution of fissile materials and/or salt materials (see FIG. 3). This may permit quick and steady heating of the solution of fissile materials and/or salt materials. Once the level of criticality necessary to initiate a fission reaction occurs, both the first heating element 110a and the second heating element 110b may be turned off. Either the first heating element 110a or the second heating element 110b may be re-activated when a temperature begins to decrease, as may be detected by one or more temperature sensors.

A number of input/exhaust ports 114 may additionally be provided to introduce new materials (e.g., fuel/a solution of fissile materials and/or salt materials) and/or to exhaust waste materials such as gases (e.g., xenon, hydrogen, krypton, and so on). Though only input/exhaust ports 114 are depicted in FIG. 1A, corresponding input/exhaust ports may be positioned on an opposite end of the suspended container 106.

The input/exhaust ports 114 may be coupled to pipes 116a (or 116b, for input/exhaust ports on an undepicted end of FIG. 1A) which may provide material to, and/or remove material from, an internal cavity of the suspended container 106. The pipes may be coupled to one or more storage tanks 118a,118b, which may hold fissile materials, salt materials, and/or waste materials, such as gases. Though the one or more storage tanks 118a,118b are provided above a surface of the soil 104, it is appreciated that the one or more storage tanks 118a,118b may be provided anywhere and may, in some cases, be buried. The materials may be provided to and/or from the storage tanks 118a,118b through any number of mechanisms. For example, pumps may be utilized to pump materials to and/or from the storage tanks 118a,118b. In some examples, actively and/or passively created vacuums may be used to insert or remove materials, such as gases, liquids, or solids.

In some embodiments, the storage tanks 118a,118b are provided with sealing mechanisms, such as a valve, with the storage tanks 118a,118b and/or pipes 116a,116b to prevent material from entering or leaving the storage tanks 118a, 118b and/or suspended container 106. The sealing mechanism may be closed when no material is desirably removed and/or added and may be opened (e.g., mechanically opened) when additions or withdrawals are made. Periodically, the pipes 116a,116b may be purged (e.g., by helium gas).

In some cases, a first set of storage tanks 118a may be used to provide materials to a suspended container 106 through the use of a first set of pipes 116a. For example, the first set of storage tanks 118a may comprise salt and/or fissile materials, in respective tanks, and may provide the materials to the suspended container 106. At least some of the first set of storage tanks 118a may additionally hold gases, such as helium, which may be used to purge the first set of pipes 116a and/or to remove dissolved gases (e.g., xenon or krypton) from a liquid salt material contained within the suspended container 106. Additionally or alternatively, a second set of storage tanks 118b may be used to store waste materials received from the suspended container 106. For example, expelled gases (e.g., xenon or krypton) may be removed through the second set of pipes 116b and may be stored in at least one of the second set of storage tanks 118b for proper disposal. As depicted in FIG. 1A, the supply tanks 118a and the waste tanks 118b may be coupled to opposite ends of the suspended container 106 (e.g., via respective pipes 116a,116b). The storage tanks 118a,118b and/or pipes 116a,116b may be provided with one or more plenums, manifolds, valves, and so on in order to control a supply and/or removal of materials or gases.

As discussed above, the suspended container 106 may include an internal tunnel 108 that extends through a length of the suspended container 106. The internal tunnel 108 may include a corrugated exterior and may be designed to, for example, increase a strength of the suspended container 106 and/or to assist in heat transfer between the suspended container 106 and a surrounding fluid (e.g., by extending a surface area of the suspended container 106). Though the internal tunnel 108 is depicted with a square-shaped cross-section, any shape may be used for the internal tunnel 108, including a circular or ovoid cross-section. As depicted in FIG. 1A, the suspended container 106 may have a torus-like shape. However, any number of shapes may be used.

FIG. 1B depicts a cross-sectional view of a cvMSR 100 taken across line A-A, as depicted in FIG. 1A. As depicted in FIG. 1B, an internal cavity of the suspended container 106 is hollow and includes a salt mixture 124. As the term is used herein, the salt mixture 124 may include fissile materials and/or salt materials. Components of the salt mixture 124 may include radioactive materials (e.g., uranium, plutonium, thorium, and so on) and salts (e.g., chloride salts, lithium salts, fluorides, and so on). The composition of the salt mixture 124 is not particularly limited and any potential configuration may be used. Here, it is noted that a surface of the salt mixture 124 may be above or beneath an input/exhaust port 114. In some cases, the salt mixture 124 extends a few inches above a bottom internal surface of the suspended container 106.

From FIG. 1B, it is apparent that an internal cavity of the suspended container 106 may additionally be corrugated. The manner of corrugation on walls of the internal cavity may correspond to corrugations on an external surface, as depicted in FIG. 1B, or may be orientated differently (e.g., an external wall may have horizontal corrugations while an internal wall has vertical corrugations). The walls of the internal cavity may additionally be provided with ceramics, such as ceramic tiles and/or laminated ceramics. The ceramics may be affixed to the walls using any number of methods, including spray deposition, affixing ceramic tiles via an adhesive, and so on. As noted above, different walls of the internal cavity may have different ceramic types affixed/deposited thereto. For example, a bottom wall may be coated with a ceramic configured to act as a catalyst for a fission reaction. Furthermore, a sidewall may be coated with a ceramic configured to neutralize/hinder a fission reaction. Additional description on this feature is discussed with respect to FIG. 3, below.

These foregoing embodiments depicted in FIGS. 1A-1B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2A:
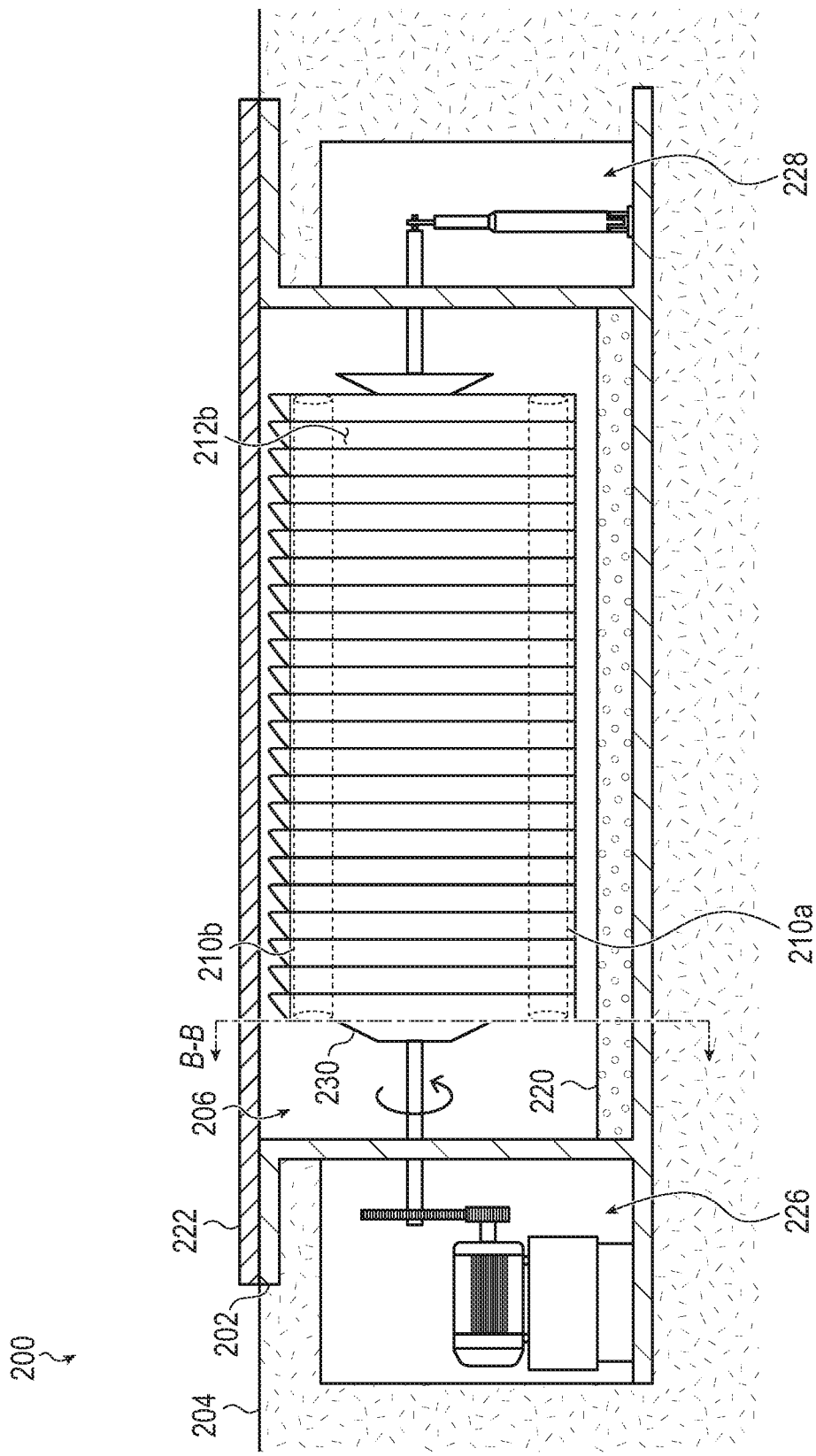
FIGS. 2A-2B illustrate an example cvMSR and a rotation structure for rotating a suspended container, as described herein.
Figure 2B:
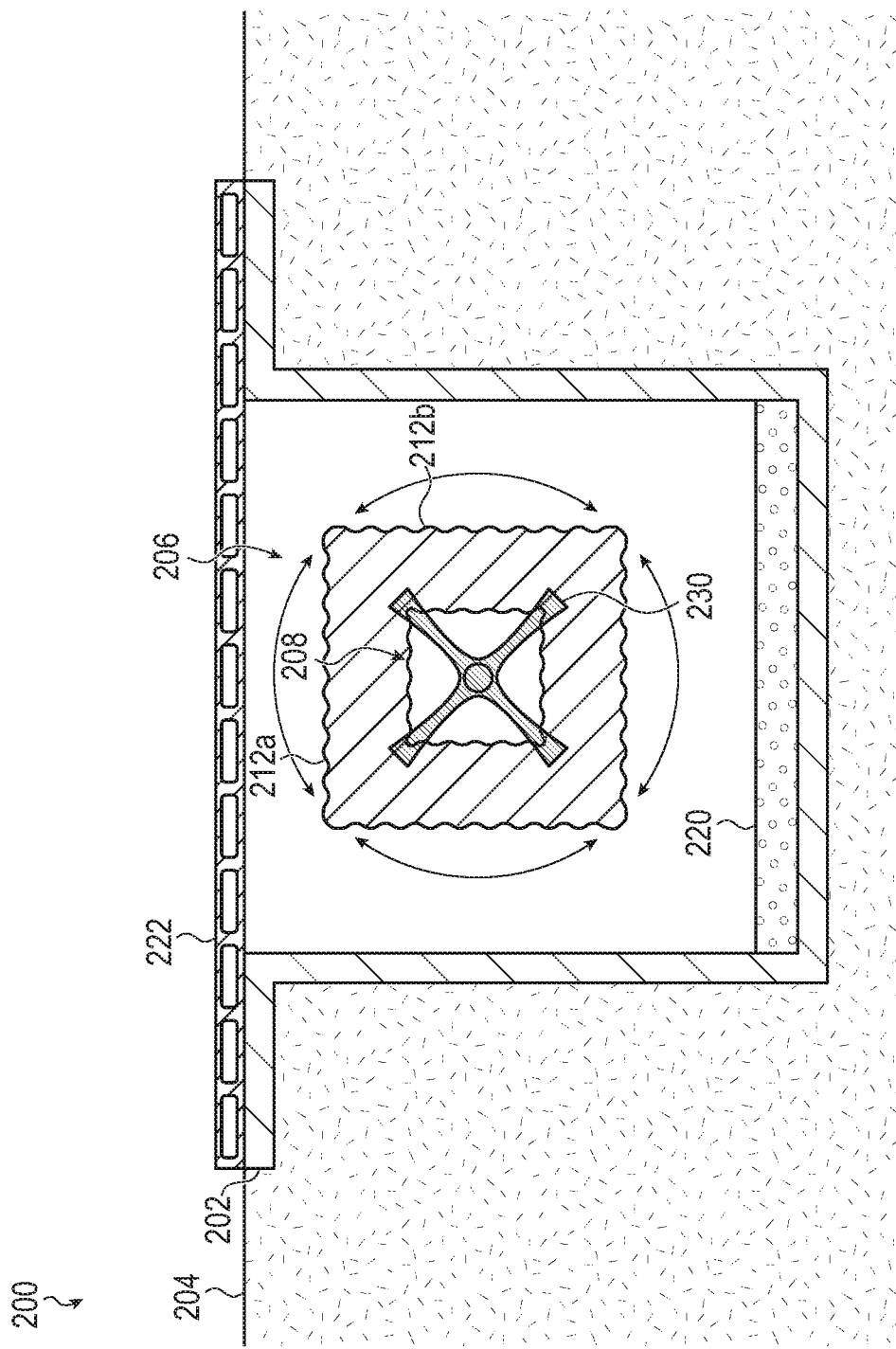

FIGS. 2A-2B illustrate an example cvMSR 200 having a suspended container 206 and a rotation motor 226 for suspending, rotating, and/or tilting the suspended container 206.

The rotation motor 226 may include a motor, a shaft, a control circuit, a potentiometer, one or more gears, and so on. The motor may be provided with a current and/or a voltage, such as direct current (DC) and/or alternating current (AC), to cause an associated shaft to begin rotation. The rotation motor 226 may be positioned in a chamber next to the enclosure 202, as depicted in FIG. 2A. In some cases, the rotation motor 226 is positioned within the enclosure 202. In embodiments where the rotation motor 226 is positioned outside of the enclosure 202, an associated shaft may extend through the enclosure 202. A torque of the rotation motor 226 is not limited to any particular value and an associated torque may be any torque capable of rotating the suspended container 206. In some cases, the rotation motor 226 rotates the suspended container 206 and any rotation axes may be used including rocking at or below 180°.

On a side of the suspended container 206, opposite from a side where the rotation motor 226 is disposed, a pillar 228 may be provided. The pillar 228 may be a structural object, without mechanical components, and may permit rotation. Additionally, the pillar 228 may secure the suspended container 206 so as to suspend the suspended container 206 within the enclosure 202.

The rotation motor 226 may provide rotation to the suspended container 206 through an end cap 230 affixed to an end of the suspended container. The end cap 230 may be formed of any suitable material, such as stainless steel, ceramic, or a high-density plastic, capable of withstanding high temperatures. The end cap 230 may be affixed to the suspended container 206 through any suitable process, including, but not limited to, welding, adhesives, and so on.

FIG. 2B illustrates a cross-sectional view of the cvMSR 200 across line B-B, as depicted in FIG. 2A. As can be seen in FIG. 2B, the suspended container 206 may be rotatable around a horizontal axis extending through a center of the suspended container. As the container rotates, a salt mixture within a hollow portion of the suspended container 206 may additionally be rotated. This may be performed for various purposes, such as to agitate the salt mixture and to heat certain areas of the salt mixture with a heating element, which, as depicted in FIGS. 1A-1B, may be provided on corner portions of the suspended container 206.

Further, a rate of rotation may be controllable. For example, the suspended container 206 may be set to rotate at any practical speed to initialize and/or suspend a nuclear reaction.

As discussed with reference to FIGS. 1A-1B, the cvMSR 200 may include an enclosure 202 defining a trench dug from soil 204, a cover 222 with a number of hollow chambers/voids 210a, 210b configured to transport heated air, horizontal corrugations 212a (see FIG. 2B), vertical corrugations 212b, and a glass 220, such as a borosilicate glass, to terminate radioactive reactions if the glass 220 comes into contact with the molten salts.

These foregoing embodiments depicted in FIGS. 2A-2B and the various alternatives thereof and variations thereto are presented, generally, for purposes of explanation, and to facilitate an understanding of various configurations and constructions of a closed-vessel molten salt reactor, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
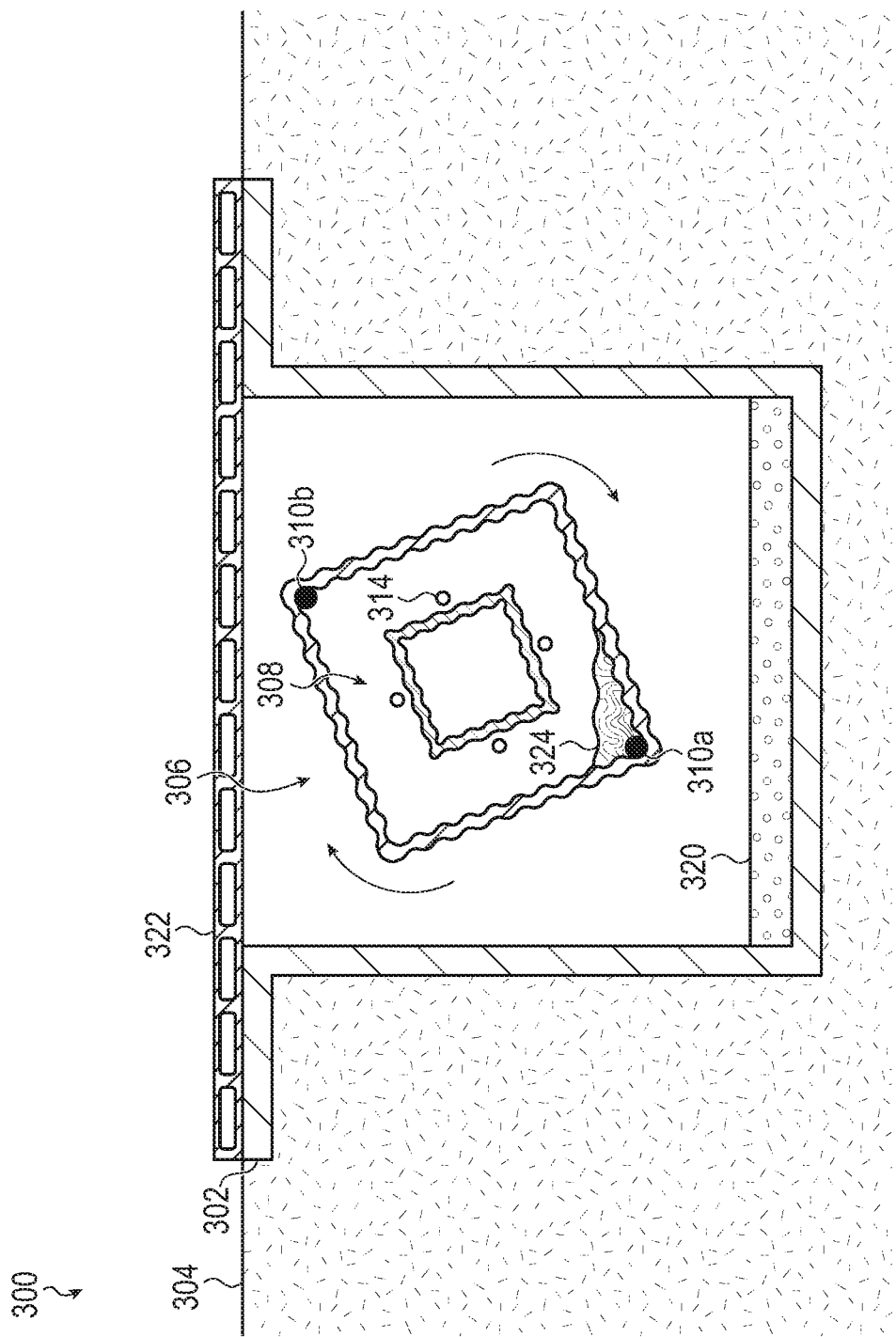
FIG. 3 illustrates a cross-sectional view of a suspended container during a rotation process where a salt mixture is agitated within the suspended container, as described herein.

FIG. 3 illustrates an example cvMSR 300 while the suspended container 306 is rotated (e.g., by the rotation motor 226 depicted in FIGS. 2A-2B). As described above, the suspended container 306 may be rotated during operations of the cvMSR 300 for a variety of purposes. For example, during a cold start process when a salt mixture 324 is solid (e.g., at or around atmospheric pressure and/or below about 500° C.), at least one of heating elements 310a,310b may be activated to provide heat to the salt mixture 324. To increase a rate of heat transfer from the heating elements 310a,310b to the salt mixture 324, the suspended container 306 may be rotated such that one heating element (e.g., heating element 310a) is submerged underneath the salt mixture 324. The suspended container 306 may be rocked back-and-forth to agitate the salt mixture 324 and to ensure different portions of the salt mixture 324 come into contact with at least one heating element 310a,310b. Internal walls of the suspended container 306 may additionally be corrugated to both provide increased structural stability and to agitate the salt mixture 324.

In some cases, to agitate the salt mixture 324 the suspended container 306 is rocked back-and-forth at or below 180° from a starting position. As described above, this rocking process may agitate the salt mixture 324 to ensure even heating and/or to ensure that the salt mixture 324 has a consistent consistency and/or material concentration throughout.

Once the salt mixture 324 heats up to a certain temperature (e.g., 500° C.), the salt mixture 324 may change state (e.g., from a solid to a liquid) or may otherwise begin a nuclear fission chain reaction. The fissile materials may be dissolved within the salt mixture 324. Once criticality is reached, fission may occur (e.g., by releasing neutrons from unstable atomic nucleuses, thereby initiating a chain reaction when the neutrons interact with other nucleuses). Once the reaction is capable of being sustained (e.g., via a chain reaction), one or more of the heating elements 310a,310b may be deactivated. The heating elements 310a,310b may be periodically reactivated when heat is required in the system. A temperature of the reaction may be limited by chemical principles (e.g., limited to a value of 1300° C.), though an operating temperature of the reaction may be set lower (e.g., anywhere between 500° C.-1300° C.).

The cvMSR 300 may operate under epithermal or fast neutron spectrums and a variety of mixtures may be used as the salt mixture 324, including mixtures with fluorides, radioactive isotopes, actinides, any combination thereof, and so on. A breeding ratio of the cvMSR 300 may be established at any value. If the breeding ratio is less than 1, additional fuel for the salt mixture 324 may be periodically provided through the input/exhaust ports 314. Even in cases where the breeding ratio is greater than or equal to 1 (e.g., when the cvMSR 300 generates more fissile material than it consumes), additional fuel or other materials may be provided to the salt mixture 324 through the input/exhaust ports 314. In some cases, gases, such as hydrogen or natural gases, are injected into the suspended container 306 through the input/exhaust ports 314 to, for example, raise temperatures and/or increase stability. It is additionally noted that a top surface of the salt mixture 324 may be below or above any of the input/exhaust ports 314.

The input/exhaust ports 314 may additionally remove gases generated during criticality, such as xenon or other gases that may be detrimental to fission criticality, that are not reabsorbed immediately into the salt mixture 324.

In the event of a core collapse (e.g., when the salt mixture 324 becomes too hot and/or experiences a runaway event), walls of the suspended container 306 may be at risk of melting or degradation. In some cases, a potential core collapse may be detected when a temperature of the cvMSR 300 reaches a threshold temperature (e.g., 1300° C.). In such cases, the suspended container 306 may be controllable to rotate to agitate the salt mixture 324, thereby releasing heat. Additionally or alternatively, internal walls of the suspended container 306 may be provided with a ceramic layer designed to moderate, or stop, a fission reaction. For example, one internal wall of the suspended container 306 may be coated with a ceramic (e.g., graphite) that acts as a moderator (e.g., converting a fast neutron fission reaction to a epithermal fission reaction). Another internal wall may be coated with a ceramic (e.g., a borate) to cool a rate at which a fission reaction occurs. By rotating the suspended container 306, the salt mixture 324 may come into contact with one or more of the ceramic coatings, thereby affecting a rate of fission. In some cases, an internal wall is coated with a ceramic designed to induce, or catalyze, a fission reaction. Additionally, though ceramic coatings (e.g., through spray depositions) are described, any ceramic may be used to cover an internal wall of the suspended container 306, including ceramic tiles, ceramic laminates, and so on. If the internal ceramics fail to cool the salt mixture 324 sufficiently, a glass 320 (e.g., a borosilicate glass) may be provided underneath the suspended container 306 as an additional failsafe. If the salt mixture 324 melts, or otherwise escapes, the suspended container 306, gravity will cause the salt mixture 324 to come into contact with the glass 320. According to particular properties of the glass 320, the fission reaction may be neutralized, thereby preventing a runaway chain reaction.

As discussed with respect to FIGS. 1A-2B, an internal tunnel 308 may be provided that extends through the suspended container 306. The internal tunnel 308 may additionally be corrugated, both on an internal and an external wall, and an internal wall of the internal tunnel 308 (e.g., a wall on an interior cavity) may be provided with a ceramic layer similarly as discussed above. In some cases, the internal wall of the internal tunnel 308 is not provided with a ceramic layer in contrast to an internal wall of the outer suspended container 306.

An enclosure 302, such as a concrete enclosure, may be positioned underground and may be surrounded by soil 304. A cover 322 may be positioned on top of the enclosure 302 and may have a number of voids/channels configured to transport hot air along a length of the cover 322.

It is further noted that the corrugations on the suspended container 306 may additionally agitate a fluid surrounding an external volume surrounding the suspended container 306. Heat generated from the salt mixture 324 may be transferred (e.g., via a heat transfer process) to the external fluid (e.g., air) and the external fluid may become superheated. This superheated fluid may be transported along the cover 322 through the channels and may be provided to a client (e.g., as used in energy generation and/or heating). Though the surrounding fluid is described as air, any fluid may be used, including another gas or a liquid such as water.

Figure 4:
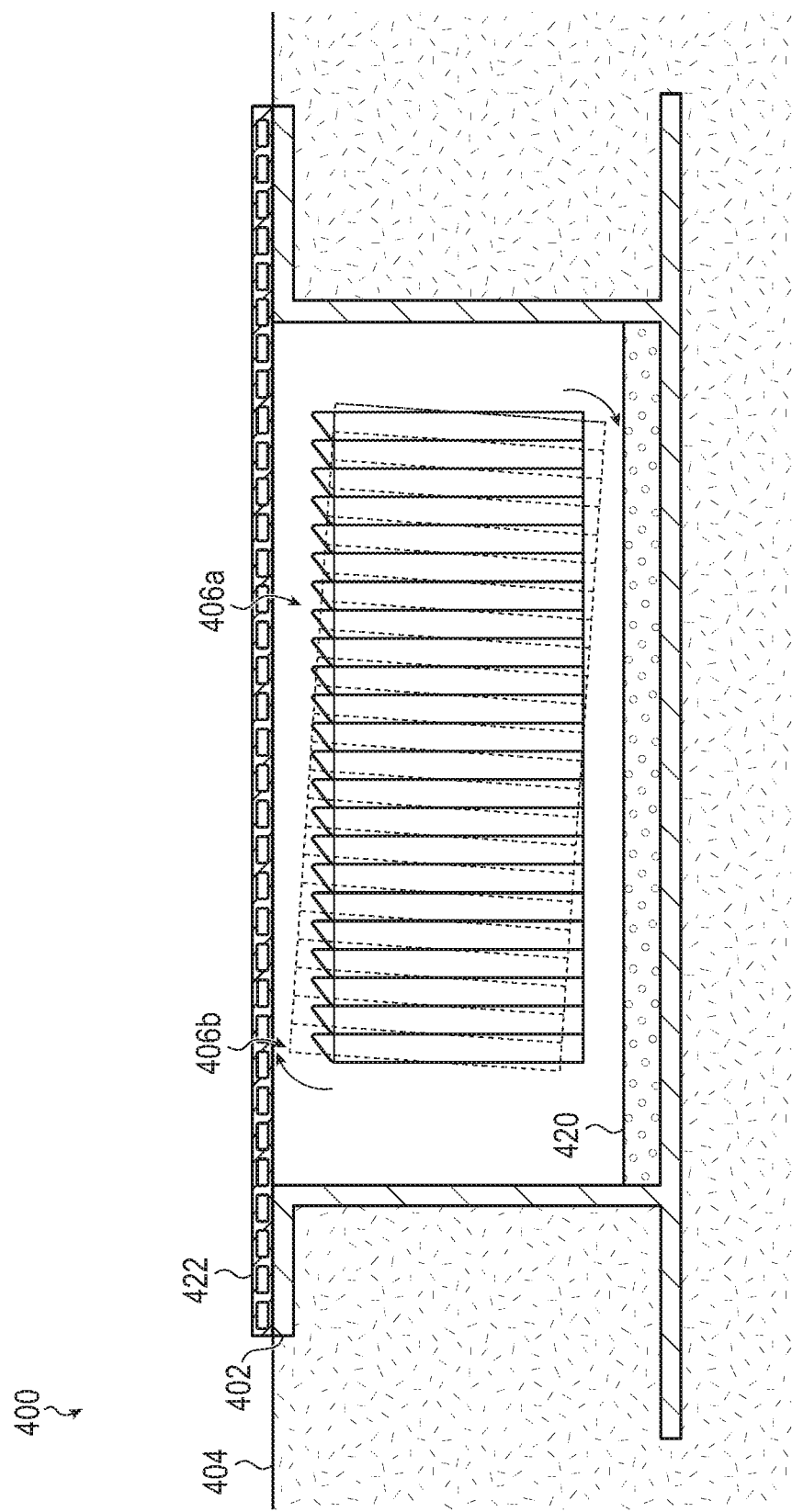
FIG. 4 illustrates a tilting operation of a suspended container, as described herein.

FIG. 4 illustrates a tilting operation of a suspended container. The cvMSR 400 may share similar features to other cvMSRs discussed herein and such duplicative description may be omitted.

As an additional or alternate means of agitating an internal salt mixture, a suspended container may be tilted about a horizontal axis. As depicted in FIG. 4, a suspended container may have a first state 406a where a horizontal axis is substantially parallel to a cover 422 and/or substantially perpendicular to a sidewall of an enclosure 402. To maximize criticality and/or to agitate an internal salt mixture, the suspended container may be tilted to a second state 406b. A transition between the first state 406a and the second state 406b may occur at any rate.

Additionally, the suspended container may oscillate between the first state 406a and the second state 406b, either quickly or slowly, to maximize a criticality of a salt mixture and/or to agitate the salt mixture. As noted above with respect to rotating processes, during a tilting process, a top surface of the salt mixture may be below, above, or at input/exhaust ports at all times during the tilting process. A mechanical mechanism (e.g., as depicted in FIG. 2A) may be used to tilt the suspended container. In some cases, the same mechanism that rotates the suspended container may additionally tilt the suspended container. In other cases, specialized mechanisms configured to only perform one function (e.g., tilting or rotation) may be provided.

An enclosure 402, such as a concrete enclosure, may be positioned underground and may be surrounded by soil 404. A cover 422 may be positioned on top of the enclosure 402 and may have a number of voids/channels configured to transport hot air along a length of the cover 422. A glass 420 may be provided underneath the suspended container and may neutralize a salt mixture, as described herein.

In some cases, the suspended container may be tilted between various states (e.g., a first state 406a and a second state 406b) to inject and/or remove materials and/or gases into or from a salt mixture. For example, the suspended container may be tilted such that a surface of the salt mixture is below, above, or at a particular input/exhaust port. Gases (e.g., helium) from a storage container may be injected into the salt mixture to purge, or otherwise remove, gases from the salt mixture (e.g., xenon). The purged gases may be removed from the suspended container by exiting through any input/exhaust port described herein.

Figure 5:
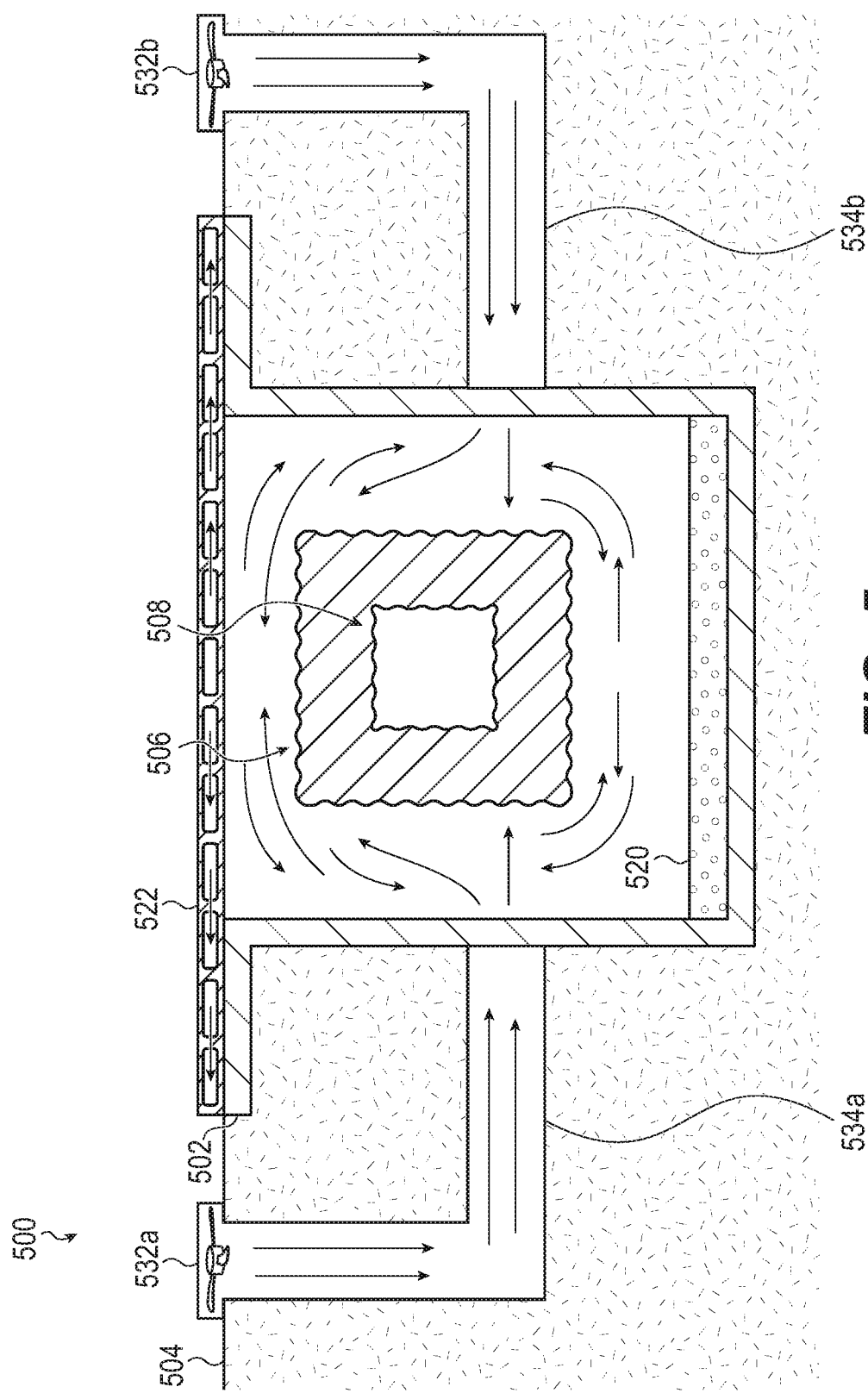
FIG. 5 illustrates the supply and circulation of a fluid flow around a suspended container, as described herein.

FIG. 5 illustrates a cvMSR 500 and an associated airflow circulation around the cvMSR 500, as depicted by arrows in FIG. 5. A first duct 534a and a second duct 534b may connect a first fan 532a and a second fan 532b to an internal cavity defined by the enclosure 502. The enclosure 502 may include a grating or hole which permits air to enter the internal cavity.

The fans 532a,532b may operate to be blow air, or other gases that may be heated for commercial purposes, into the area defined by the enclosure 502 through the ducts 534a, 534b. As the air enters the enclosure 502, the suspended container 506 (and, in particular, corrugations of the suspended container 506) may agitate the air such that an airflow is produced around the suspended container 506 and/or through the internal tunnel 508 of the suspended container. Heat generated by a salt mixture contained within the suspended container 506 may be transferred to the air or other gases surrounding the suspended container 506 through, for example, conductive heat transfer. A rate of heat transfer may be increased by an increased surface area of the suspended container 506 (e.g., through corrugations on a surface of the suspended container 506 and/or by the presence of the internal tunnel 508), by a material of the suspended container 506 (e.g., a metal or a ceramic), by an airflow rate, and so on.

Due to the heat transfer, the airflow surrounding the suspended container 506 may become hotter and may begin to rise toward the cover 522. Channels/voids within the cover may receive the heated air and may transport the heated air for use in other operations (e.g., heating a property or generating steam for energy production). In some cases, the fans 532a,532b assist in transporting the heated air from the cover 522. The fans 532a,532b may be individually controllable, so to change a rate of air flow from only one of vents 534a,534b, or may be controllable as a unit.

The fans 532a,532b may be coupled to sensors and may automatically decrease or increase an airflow rate in response to readings from, for example, heat sensors and/or pressure sensors. While the fans 532a,532b are depicted outside of the enclosure 502 and above a soil level, the fans 532a,532b may be positioned in any location according to aspects of the provided disclosure. In some cases, the ducts 534a,534b and/or fans 532a,532b are provided with one-way filters to prevent or hinder air that circulated around the suspended container 506 from re-entering the ducts 534a, 534b and/or fans 532a,532b.

An enclosure 502, such as a concrete enclosure, may be positioned underground and may be surrounded by soil 504. A cover 522 may be positioned on top of the enclosure 502 and may have a number of voids/channels configured to transport hot air along a length of the cover 522. A glass 520 may be provided underneath the suspended container and may neutralize a salt mixture, as described herein.

These foregoing embodiments depicted in FIGS. 3-5 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 6A:
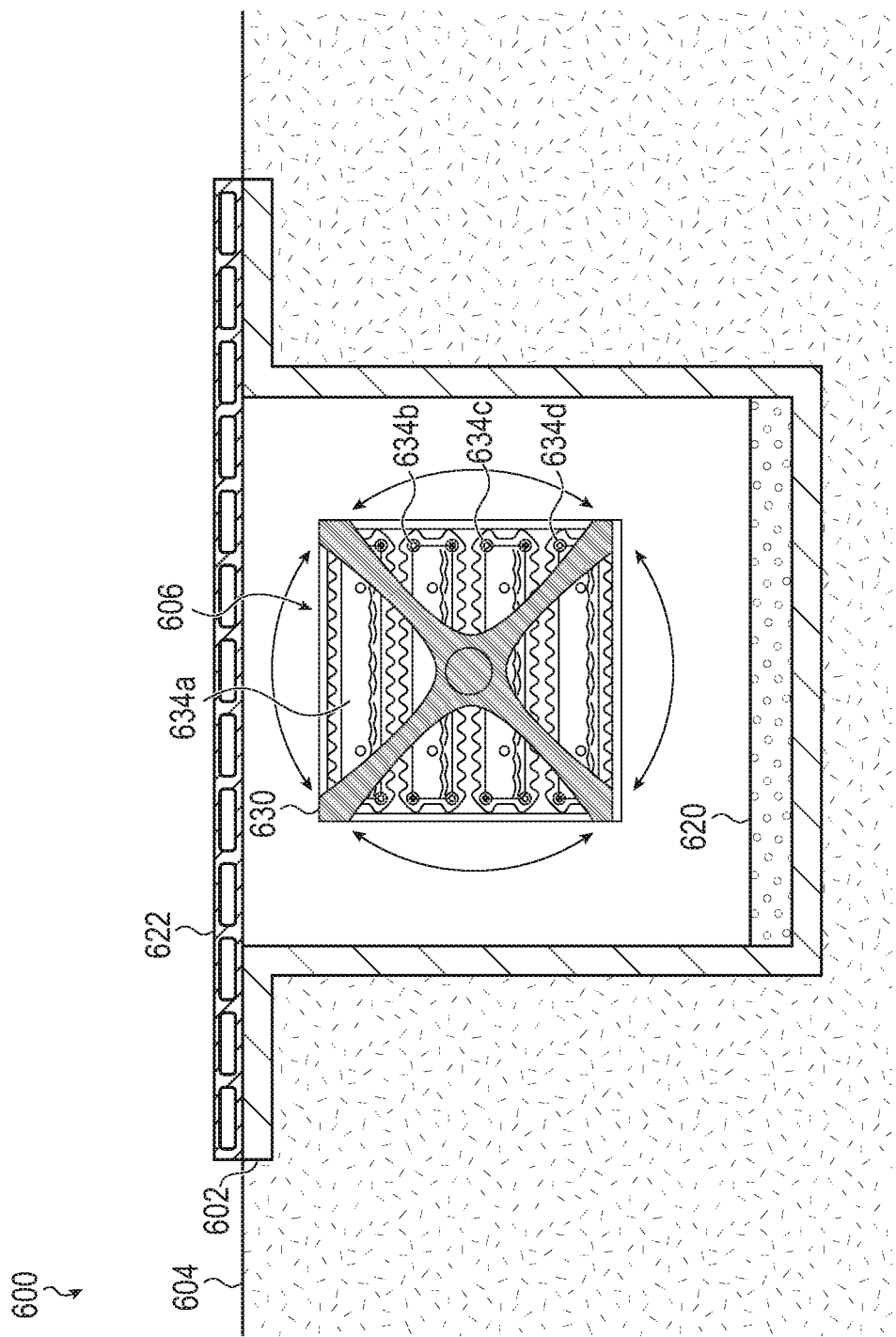
FIGS. 6A-6B illustrate an example cvMSR including a suspended container having a number of modular containers and an example of such a modular cavity, as described herein.
Figure 6B:
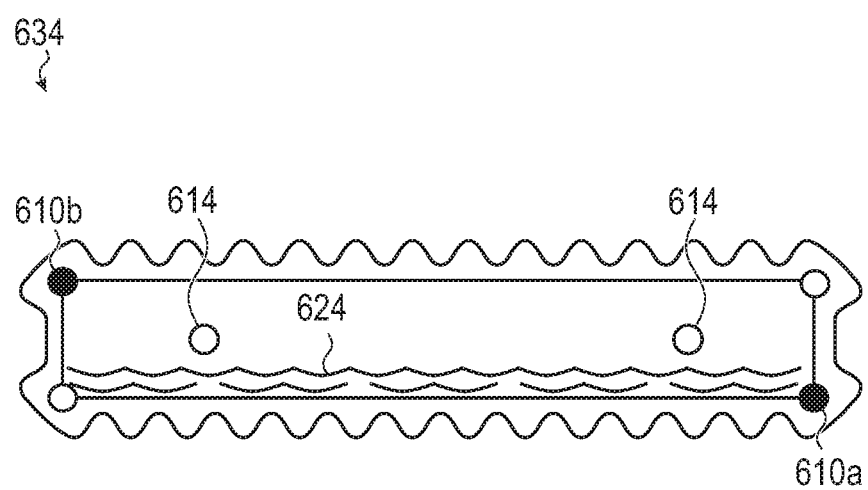

FIGS. 6A-6B illustrate an example cvMSR 600 including a number of modular containers 634a-634d and an example modular container 634. Features of the cvMSR 630 may be similar to those discussed with respect to FIGS. 1A-5 and duplicative descriptions may be omitted for simplicity.

The cvMSR 600 may comprise a suspended container 606. The suspended container 606 may be suspended within the enclosure 602 by an end cap 630 (see, e.g., FIGS. 2A-2B). The suspended container 606 may have a corrugated exterior portion to provide increased structural stability, to agitate a surrounding fluid, to provide high-quality heat exchange, and so on.

A number of modular containers 634a-634d may be provided inside of the suspended container 606. Each modular container may comprise one or more heating elements, a salt mixture, and one or more input/exhaust ports. External and/or internal walls of each modular container 634a-634d may be corrugated in order to agitate the respective salt mixtures and/or to facilitate heat exchange. Due to the presence of the modular containers 634a-634d, a surface area in contact with a salt mixture may increase. For example, if the salt mixture were combined into one volume, a heat exchange rate may be decreased. By separating the salt mixture out among different modular containers 634a-634d, the surface area in contact with the salt mixture may be increased. Additionally, multiple heating elements may be provided to each individual modular container 634a-634d, which may improve a cold start rate.

In some cases, the modular containers 634a-634d are removable while the cvMSR 600 is not operating. For example, if one modular container (e.g., 634a) requires replacement while the others (e.g., 634b-634d) do not, then the modular container 634a may be removed and replaced with another modular container.

An enclosure 602, such as a concrete enclosure, may be positioned underground and may be surrounded by soil 604. A cover 622 may be positioned on top of the enclosure 602 and may have a number of voids/channels configured to transport hot air along a length of the cover 622. A glass 620 may be provided underneath the suspended container and may neutralize a salt mixture, as described herein.

FIG. 6B depicts an example of one particular modular container 634, as provided in FIG. 6A. The modular container 634 may be formed from a metal and/or ceramic. In some cases, the modular container 634 is formed from a stainless steel and internal walls of the modular container 634 (e.g., walls in contact with a salt mixture 624) may be lined with a ceramic tile and/or layer. As discussed herein, the salt mixture 624 may comprise fissile materials, such as uranium, thorium, or plutonium compounds, and salt materials, such a fluorides. The modular container 634 may be rotatable about an axis such that the salt mixture 624 rotates with respect to the modular container 634.

Input/exhaust ports 614 may additionally be provided with the modular container 634 and may supply materials, such as fissile materials, gases such as hydrogen or carbon dioxide, and salt materials, to the modular container 634. In addition, the input/exhaust ports 614 may permit gases produced by the salt mixture 624 (e.g., when the salt is molten) to leave the modular container 634. Multiple heating elements 610a,610b may additionally be provided to introduce heat into the modular container 634 and, in particular, to the salt mixture 624. The heating elements 610a,610b may, in some cases, be a resistive heater, though any heating element may be used.

As discussed above, a suspended container may have any shape, including a cuboid having a square-shaped cross-section, a rectangular-shaped cross-section, a hexagonal-shaped cross-section, and so on. In addition, an internal tunnel may have any shape including, but not limited to, an extended square, circle, triangle, and so on.

Figure 6C:
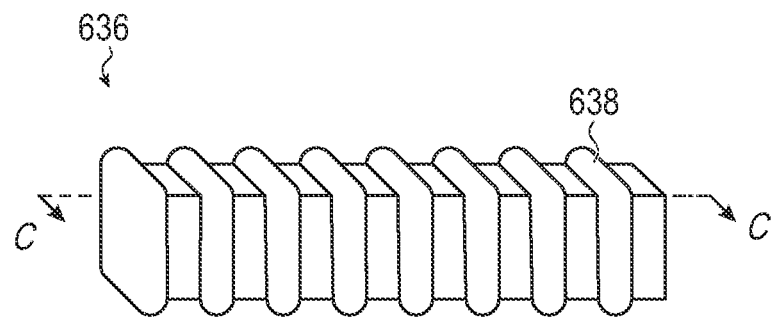
FIGS. 6C-6D illustrate an example cvMSR with internal and/or external geometry that may be additively manufactured to include one or more fluid conduits and/or internal mechanical agitation geometry.
Figure 6D:
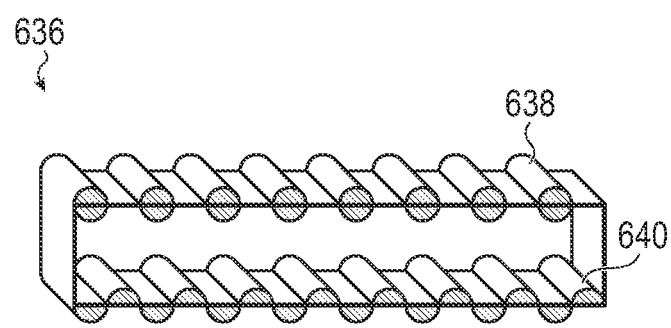

For example, FIG. 6C depicts a modular container 636 with cylindrical protrusions 638 extending from external sidewalls of the modular container 636. In this construction, shown in cross-section in FIG. 6D (taken along line C-C of FIG. 6C), an internal volume can also be constructed with cylindrical protrusions 640. In some constructions a first sidewall set of internal protrusions can be offset relative to a second sidewall set of internal protrusions. For example, as shown in FIG. 6D, a lower sidewall set of protrusions may be offset relative to an upper sidewall set of protrusions.

These foregoing examples are not exhaustive. It may be appreciated that any suitable geometry can be selected to define contours of an internal profile or an external profile of a modular container as described herein. In some cases, complementary profiles can be defined along opposite sidewalls, although this is not required. In other cases, internal protrusions can have multiple profiles, which may be specific to (and/or repeated along) certain sidewalls (such as control surface sidewalls or moderating surface sidewalls).

Independent of internal or external construction, control surfaces and/or moderating surfaces of an internal volume of a modular container (and/or cvMSR) as described herein can be formed in a number of suitable ways. For example, in cross-section shown in FIG. 6E, a sidewall cross-section 642 of a volume as described herein can include an external surface material 644 supported by and/or structurally defined by a carbon fiber tow, within a cured epoxy that may be doped with one or more materials such as boron or tungsten. Similarly, the sidewall cross-section 642 may include an internal surface material 646 that is formed as a control layer, as described herein. The control layer can be formed from, in one example, boron carbide.

Figure 6E:
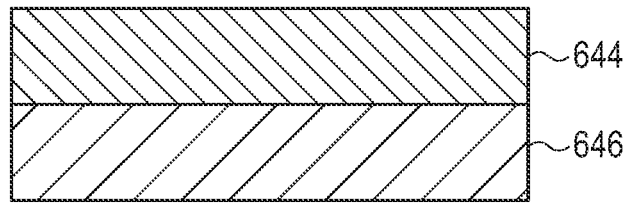
FIGS. 6E-6F illustrate example cross-sections of sidewalls of a closed-vessel cvMSR that may be at least partially additively manufactured.
Figure 6F:
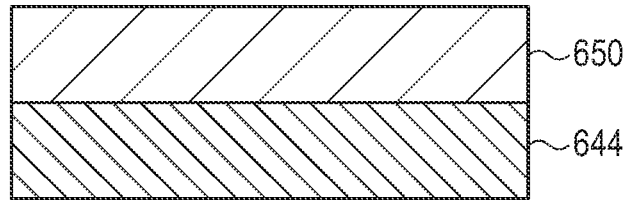

In other cases, a sidewall cross-section 648 as shown in FIG. 6F can include an external surface material 644, which may be the external surface 644 of FIG. 6E. The external surface material 644 may be supported by and/or structurally defined by a carbon fiber tow or other carbon fiber layer, within a cured epoxy that may be doped with one or more materials such as boron or tungsten. Similarly, the sidewall cross-section 648 may include an internal surface 650 that is formed as a moderation layer, as described herein. The moderation layer can be formed from, in one example, graphite.

In many embodiments, the control layer can be 3D printed along with a moderation layer. In other words, the sidewall cross-section 642 and the sidewall cross-section 648 can be printed as a unitary body (with one or more channels defined during the printing process) in a multi-material printing process. Once printed, the unitary body can be subjected to curing/hardening conditions and/or wrapped in carbon fiber tow and coated in a doped epoxy slurry which, in turn, can be subjected to curing conditions. In some cases, carbon fiber tow can be wrapped around the unitary body as the unitary body is being printed.

Figure 7:
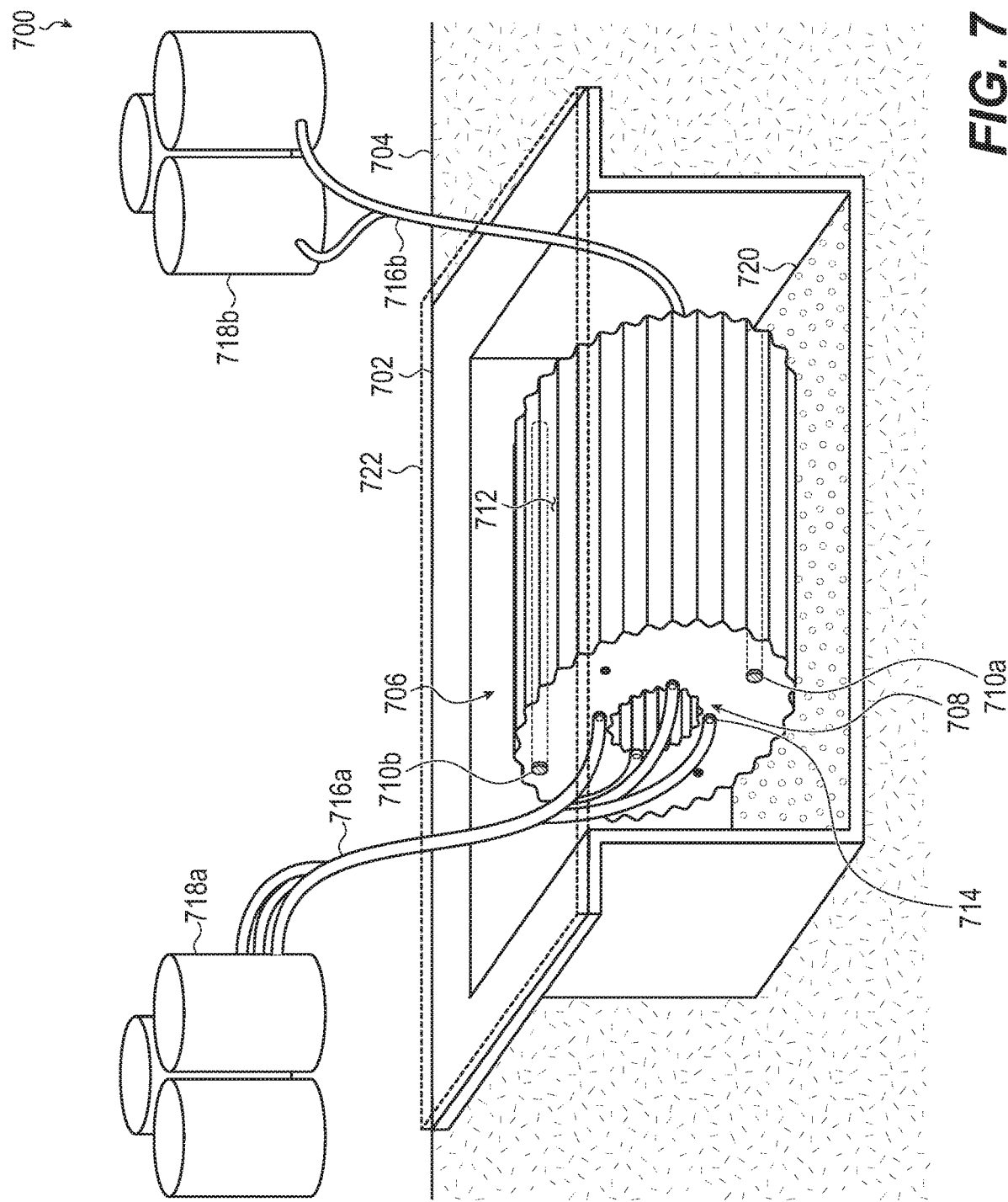
FIG. 7 illustrates an example cvMSR including a cylindrically-shaped suspended container for containing a salt mixture, as described herein.

FIG. 7 depicts an example of a cylindrical-shaped suspended container 706. The cylindrical-shaped suspended container 706 may be formed of any material, including metal, such as stainless steel, ceramics, any combination thereof, and the like. The cvMSR 700 may otherwise be similar to the cvMSR 100 depicted in FIGS. 1A-1B and duplicative description may be omitted.

An enclosure 702, such as a concrete enclosure, may be positioned underground and may be surrounded by soil 704. A cover 722 may be positioned on top of the enclosure 702 and may have a number of voids/channels configured to transport hot air along a length of the cover 722. A glass 720 may be provided underneath the suspended container and may neutralize a salt mixture, as described herein.

A number of heating elements 710a,710b may be provided at certain locations along the cylindrical-shaped suspended container 706 and may heat a salt mixture contained within the cylindrical-shaped suspended container 706. Further, an internal tunnel 708 may extend through a center portion of the cylindrical-shaped suspended container 706 and may increase a heat transfer between a salt mixture and a fluid (e.g., air) surrounding the cylindrical-shaped suspended container 706. The cylindrical-shaped suspended container 706 can be formed with and/or may include corrugated and/or finned external surface features, such as the corrugations 712.

A number of input/exhaust ports 714 may be provided on the cylindrical-shaped container 706 and may provide materials, including gases or fuels, or may remove materials, including waste gases, to and from the cylindrical-shaped container 706. The input/exhaust ports 714 may be coupled to one or more storage tanks 718a,718b through one or more pipes 716a,716b.

These foregoing embodiments depicted in FIGS. 1A-7 and the various alternatives thereof and variations thereto are presented, generally, for purposes of explanation, and to facilitate an understanding of various configurations and constructions of a system, volume, and methods of printing and using the same, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 8:
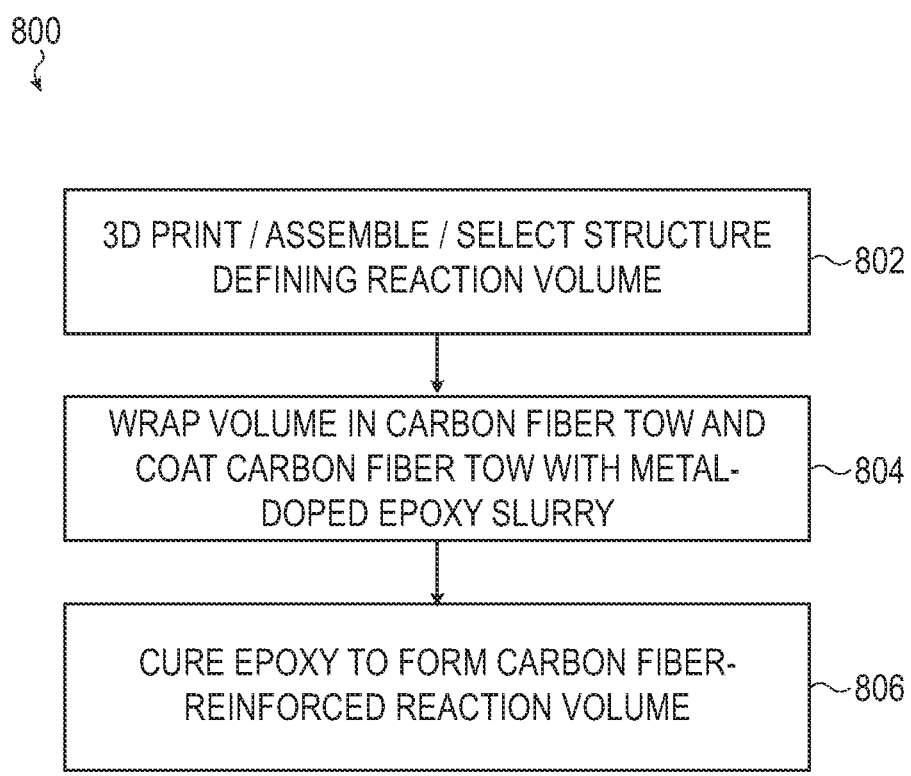
FIG. 8 is a flowchart corresponding to a method of manufacturing a cvMSR as described herein.

For example, many embodiments described relate to methods of operating a cvMSR and/or methods of manufacturing a cvMSR as described herein. For example, FIG. 8 depicts a method of manufacturing a cvMSR as described herein.

The method 800 includes operation 802 at which a structure defining a reaction volume can be formed. In some examples, the reaction volume can be formed by 3D printing, by assembly, or by any other suitable process.

The method 800 also includes operation 804 at which the structure of operation 802 can be wrapped in carbon fiber tow and coated in a metal-doped high-temperature epoxy slurry. Example dopants include, but are not limited to, boron or tungsten. In other embodiments other materials may be selected for epoxy/resin used to harden the carbon fiber tow. The method 800 also includes operation 806 at which the epoxy can be cured to define a reinforced reaction volume.

Figure 9:
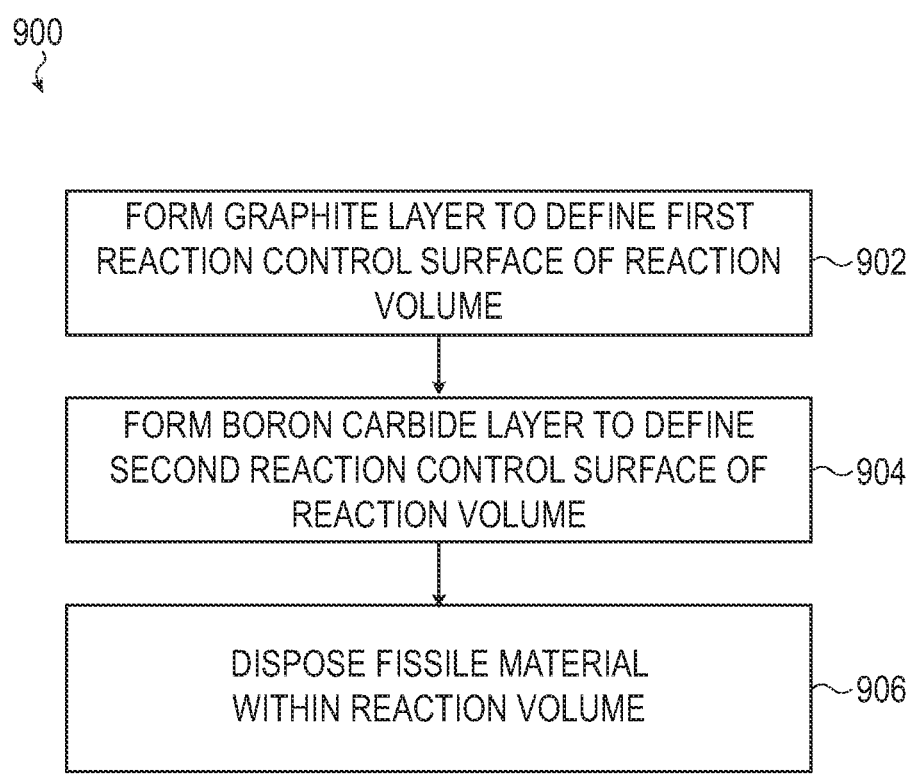
FIG. 9 is a flowchart corresponding to a method of manufacturing a cvMSR as described herein.

FIG. 9 depicts a method of manufacturing a molten salt reactor as described herein. The method 900 includes operation 902 at which a graphite layer (or other moderator material layer) can be formed into and/or to define an internal surface of a reaction volume. In many embodiments, this layer may be referred to as a moderator layer.

The method 900 includes operation 904 at which a boron carbide layer (or other control material layer) can be formed into and/or to define an internal surface, different from the moderator layer (in many cases, opposite the moderator layer) of the reaction volume. In many embodiments, this layer may be referred to as a control layer.

The method 900 also includes operation 906 at which a fissile material, and/or or more salts such as described above, can be disposed within the reaction volume. Thereafter, the reaction volume may be sealed. For example, after disposing the fissile material within the volume, a layer of carbon fiber tow may be wrapped around a fill aperture so as to effectively seal the reaction volume. In other cases, a graphite or boron carbide plug can be inserted to close a fill aperture. A person of skill in the art will readily appreciate that many solutions are possible.

Figure 10:
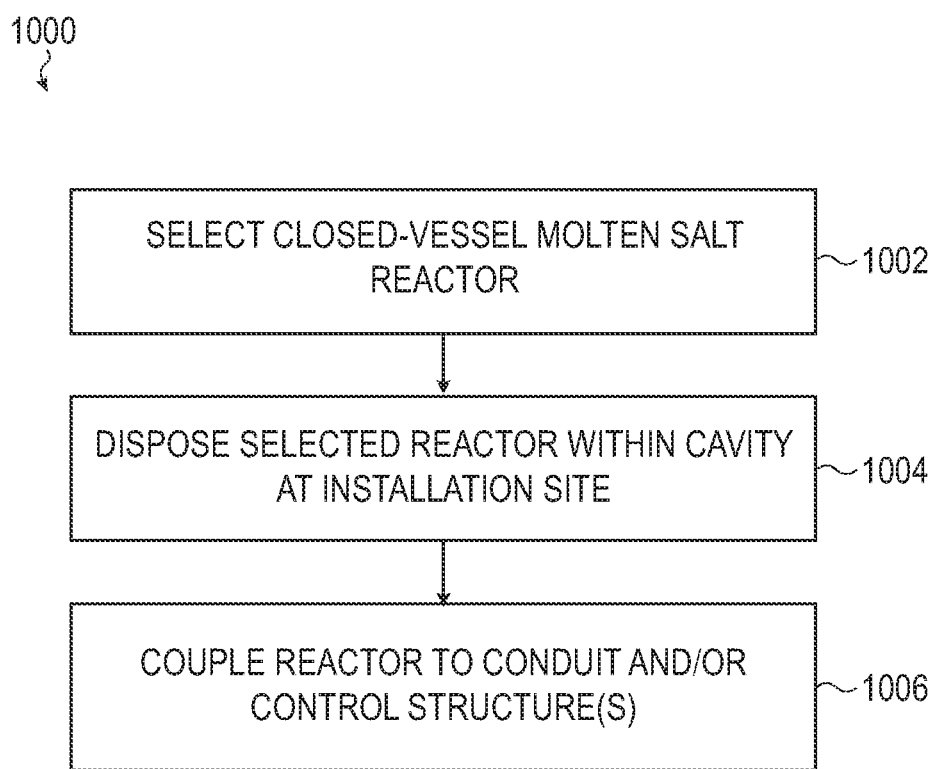
FIG. 10 is a flowchart corresponding to a method of installing a closed-vessel cvMSR at an installation site, as described herein.

FIG. 10 depicts a method of installing a cvMSR at a site, such as described herein. The method 1000 includes operation 1002 at which a cvMSR may be formed (e.g., by 3D printing, by assembly, and so on). Next at operation 1004 the method 1000 continues to dispose the selected cvMSR within a cavity, which may be formed from concrete such as described above with respect to FIGS. 1A-1B. Finally at operation 1006, one or more conduits which may be configured to transit one or more fluids can be mechanically coupled to the cvMSR. In some embodiments, the cvMSR can be additionally coupled to one or more suspension and/or motion structures, such as described above.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Certain embodiments described herein take the form of a container for enclosing and moderating a fission reaction of a molten salt mixture with a fissile material dissolved in a molten salt, the molten salt mixture disposed in the container to a selected volume less than an internal volume of the container, the container including at least a moderator layer formed from graphite and defining a first internal surface of the internal volume, the first internal surface having a first corrugated profile, and configured to contact the molten salt mixture when the container may be oriented in a first orientation, thereby moderating the fission reaction, and separate from the molten salt mixture when the container may be oriented in a second orientation different from the first orientation, a control layer formed from boron carbide and defining a second internal surface of the internal volume, the second internal surface having a second corrugated profile, and positioned opposite the moderator layer, and configured to contact the molten salt mixture when the container may be oriented in the second orientation, thereby controlling a speed of the fission reaction, and separate from the molten salt mixture when the container may be oriented in the first orientation, and a body supporting the moderator layer and the control layer, enclosing the internal volume.

Related and additional embodiments include a configuration in which the first corrugated profile mirrors the second corrugated profile.

Related and additional embodiments include a configuration in which the container has a rectangular profile.

Related and additional embodiments include a configuration in which the moderator layer may be oriented parallel to the control layer.

Related and additional embodiments include a configuration in which the moderator layer extends across at least two internal surface of the rectangular profile.

Related and additional embodiments include a configuration in which the control layer extends across at least two internal surfaces of the rectangular profile.

Related and additional embodiments include further with an external layer with carbon fiber tow.

Related and additional embodiments include a configuration in which the carbon fiber tow may be wrapped around an external surface of the body.

Related and additional embodiments include a configuration in which the external layer includes a dopant with at least one of boron or tungsten.

Related and additional embodiments include a configuration in which the body may be formed from metal.

Related and additional embodiments include a configuration in which the body may be formed, at least in part, from carbon fiber tow.

Related and additional embodiments include a configuration in which the body defines an external surface having a third corrugated profile.

Some related and additional embodiments include a configuration in which the body defines at least one fluid conduit facilitating heat transfer from the fission reaction to a fluid within the fluid conduit.

Certain embodiments described herein take the form of a closed-vessel molten salt reactor including at least an enclosure defining an internal cavity, a moveable container configured to contain a salt mixture with a fissile material dissolved in a salt, the salt mixture disposed in the moveable container to a selected volume less than an internal volume of the moveable container, the movable container suspended within the internal cavity defined by the enclosure and including at least a moderator layer formed from a moderator material defining a first internal surface of the moveable container, the first internal surface having a first corrugated profile and configured to contact the salt mixture when the container may be oriented in a first orientation, thereby moderating the fission reaction, a control layer formed from boron carbide and defining a second internal surface of the moveable container, the second internal surface having a second corrugated profile and positioned opposite the moderator layer and configured to contact the salt mixture when the container may be oriented in a second orientation, thereby controlling a speed of the fission reaction, and configured to separate from the molten salt mixture when the container may be oriented in the first orientation, and a body supporting the moderator layer and the control layer, enclosing the internal cavity and a resistive heater configured to heat the salt mixture to bring the salt mixture to a temperature facilitating a fission reaction.

Some related and additional embodiments include a configuration in which the body includes a fluid conduit configured to operate as a heat exchanger between a fluid within the fluid conduit and the internal cavity.

Some related and additional embodiments include a configuration in which the movable container may be configured to rotate about a first axis within the enclosure.

Some related and additional embodiments include a configuration in which the movable container may be configured to rotate to transition between the first orientation and the second orientation.

Some related and additional embodiments include a configuration in which the moderator layer includes graphite, the control layer comprise boron carbide, and the moveable container may be additively manufactured.

Embodiments described herein take the form of a method of controlling a fission reaction of a mixture with a fissile material dissolved in a molten salt, the mixture disposed within a sealed internal volume of a container to a selected fill volume less that of the sealed volume, the method including operations such as (1) orienting the container to a first orientation such that the mixture contacts a moderator surface defined by a graphite layer disposed on a first internal surface of the sealed internal volume and the mixture separates from a control surface defined by a boron carbide layer disposed on a second internal surface of the sealed internal volume, the second internal surface at least partially opposite from the first internal surface, and (2) in accordance with a determination to reduce a reaction speed of the fission reaction, orienting the container to a second orientation such that the mixture contacts the control surface, and the mixture separates from a moderator surface.

Some related and additional embodiments include a configuration in which transitioning the orientation of the container from the first orientation to the second orientation includes rotating the container along an axis.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A container for enclosing and moderating a fission reaction, the container comprising:
   a set of internal surfaces defining an internal volume of the container;
   a molten salt mixture disposed within the internal volume and comprising a fissile material dissolved in a molten salt;
   a moderator layer formed from graphite and:
      defining a first internal surface of the set of internal surfaces, the first internal surface having a first corrugated profile; and configured to:
         contact the molten salt mixture when the container is oriented in a first orientation, thereby moderating the fission reaction; and
         separate from the molten salt mixture when the container is oriented in a second orientation different from the first orientation; and
   a control layer formed from boron carbide and:
      defining a second internal surface of the set of internal surfaces, the second internal surface having a second corrugated profile; and
      positioned facing opposite the first internal surface; and configured to:
         contact the molten salt mixture when the container is oriented in the second orientation, thereby controlling a speed of the fission reaction; and
         separate from the molten salt mixture when the container is oriented in the first orientation.

2. The container of claim 1, wherein the first corrugated profile faces opposite the second corrugated profile.

3. The container of claim 1, wherein the container has a rectangular profile.

4. The container of claim 3, wherein the moderator layer is oriented parallel to the control layer.

5. The container of claim 3, wherein:
   the moderator layer extends across at least two internal surfaces of the rectangular profile; and
   the at least two internal surfaces comprise:
      a first moderator layer internal surface oriented in a first planar configuration with respect to the rectangular profile; and
      second moderator layer internal surface oriented adjacent to the first internal surface, the second moderator layer internal surface oriented in a second planar configuration perpendicular to the first planar configuration.

6. The container of claim 3, wherein:
   the control layer extends across at least two internal surfaces of the rectangular profile; and
   the at least two internal surfaces comprise:
      a first control layer internal surface oriented in a first planar configuration with respect to the rectangular profile; and
      a second control layer internal surface oriented adjacent to the first internal surface, the second control layer internal surface oriented in a second planar configuration perpendicular to the first planar configuration.

7. The container of claim 1, further comprising an external layer comprising carbon fiber tow.

8. The container of claim 7, wherein the carbon fiber tow forms an external surface of the container.

9. The container of claim 7, wherein the external layer comprises a dopant comprising at least one of boron or tungsten.

10. The container of claim 1, wherein the container comprises metal.

11. The container of claim 1, wherein the container comprises carbon fiber tow.

12. The container of claim 1, wherein the container defines an external surface having a third corrugated profile.

13. The container of claim 1, wherein the container defines at least one fluid conduit facilitating heat transfer from the fission reaction to a fluid within the at least one fluid conduit.

14. The container of claim 1, wherein the second orientation comprises a position of the container after a rotation of the container along a longitudinal axis from the first orientation.

15. The container of claim 14, wherein the rotation of the container comprises a 180 degree rotation.

* * * * *